Figure 1:
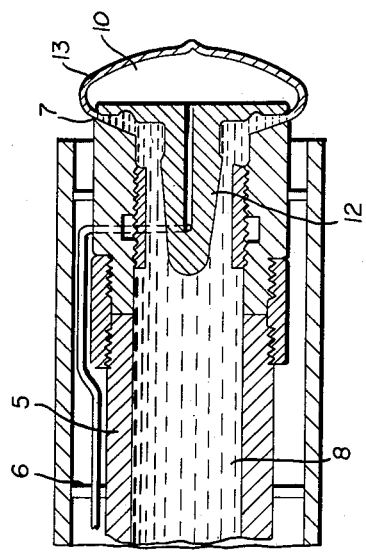
Figure 1:
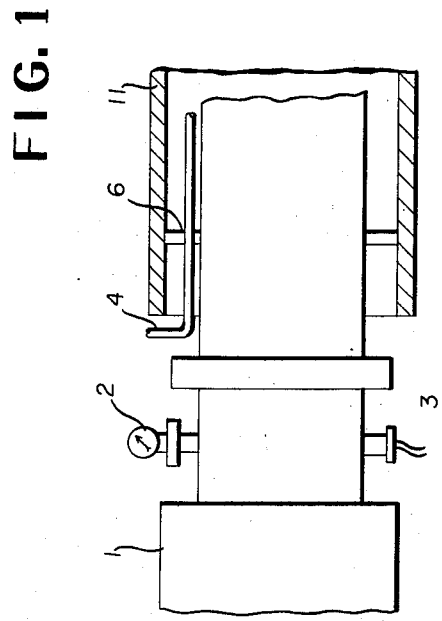

July 12, 1960    E. C. BERNHARDT ET AL    2,944,298
COATING THE INTERIOR SURFACES OF TUBULAR ARTICLES
Filed Sept. 22, 1958    2 Sheets-Sheet 1

INVENTORS
ERNEST CARL BERNHARDT
JOHN ANTHONY BOXLER
PHILIP EPHRAIM PRINCE
BY
*A. McAlevy*
ATTORNEY

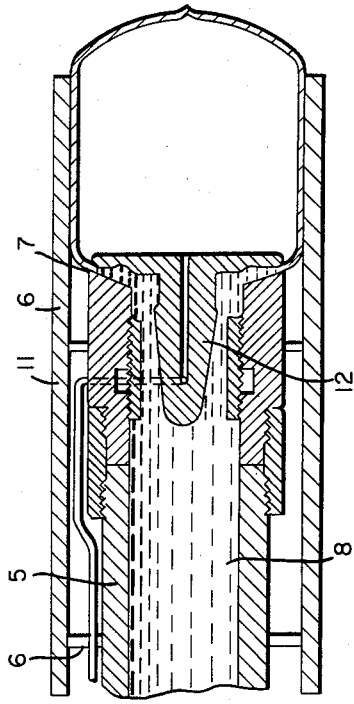
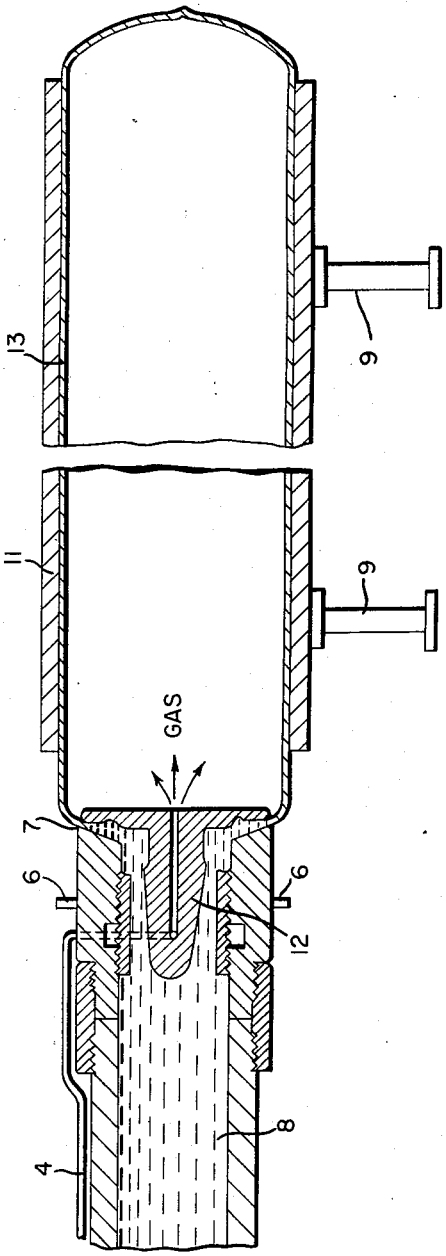
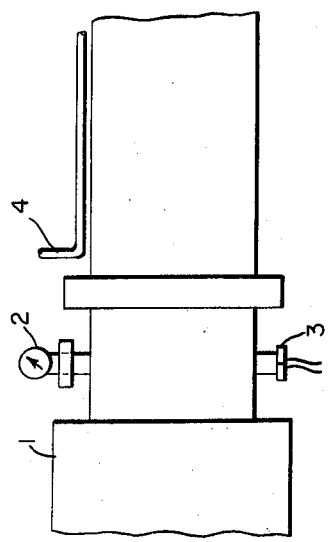
INVENTORS
ERNEST CARL BERNHARDT
JOHN ANTHONY BOXLER
PHILIP EPHRAIM PRINCE
BY
*A. McAlevy*
ATTORNEY

United States Patent Office 2,944,298
Patented July 12, 1960

2,944,298

COATING THE INTERIOR SURFACES OF TUBULAR ARTICLES

Ernest Carl Bernhardt, John Anthony Boxler, and Philip Ephraim Prince, Wilmington, Del., assignors to E. I. du Pont de Nemours and Company, Wilmington, Del., a corporation of Delaware Filed Sept. 22, 1958, Ser. No. 762,463

7 Claims. (Cl. 18—59)

This invention relates to a method for applying a polymeric lining to an interior surface of an article, such as pipe, tubing, ducts, and the like.

Heretofore, numerous methods have been employed for applying coatings to the interior walls of metal tubing, pipe, barrels, etc. In general, many of these methods have involved dipping in polymer solutions, or the application of hot melt sprays which produced adhering coatings of resins such as polyethylene when the surface of the metal was properly prepared. These methods have been somewhat cumbersome, or relatively ineffective. Spray methods, for example, have not been well suited for the production of elongated articles, such as pipe, where coating of the interior surfaces has been required. Other methods have recently been developed for lining metal tubes with thermoplastic materials. Thus in British Patent 778,034 a polyethylene film is inserted in the form of a tube within a metal tube, and gas pressure is applied within the plastic tube, while externally heating the assembly, followed by cooling, to obtain the lined metallic tube. Methods for applying elastic coating to the interior of woven tubes by means of inflated inserts have also been described (cf. U.S. Patent 2,803,056 issued August 20, 1957, to R. M. Brissey and G. W. Roberts). However, as noted in U.S. Patent 2,695,255 issued November 23, 1954, to D. W. Avery, methods which depend upon expansion of a thermoplastic liner within a metal pipe tend to produce air pockets, unless special precautions are taken.

The present invention is directed to an improved method for applying thermoplastic coatings to the interior walls of articles having a generally tubular shape, such as conduits, pipe, tubing, ducts, container walls, etc.

In accord with the present invention a method is provided for applying a coating upon the interior surface an article of generally tubular shape, by injecting a gas into a bubble of molten thermoplastic material while the thermoplastic material is being extruded, the said bubble being positioned within the article to be coated, a critical feature of the method being the movement of the article in the direction of the flow, as the article receives the extruded blown melt from the extruder. Specific details for accomplishing this result are described hereinbelow.

The tubular articles which may be lined by the process of this invention are not limited to those having a round cross-section, but include generally tubular articles of any cross-section shape whatever, e.g. rectangular, elliptical, etc.

The interior surfaces of such tubular articles are coated with thermoplastic material according to the method of this invention by conducting thermoplastic material through an elongated walled passage to an annular die, the inner surface of the article to be coated being initially exterior to the outer surface of the wall confining said passage, extruding the thermoplastic material through the annular die, injecting a gas into the tube of thermoplastic material thus formed and sealing the resultant thermoplastic tube to form a bubble, moving the article to be coated in the direction of the flow of thermoplastic material, and over said bubble, into a position concentric with the annular die, continuing the motion of the said article in the direction of the flow of thermoplastic material and continuing the injection of gas, whereby the thermoplastic material is impressed against the said interior surface to be coated, continuing further the said motion of the said article while it is being coated, and the said impressing of the thermoplastic material against the surface which is being coated until the coating is completed and the article has moved forward of said die, and thereafter severing the thermoplastic extrudate between the die and the coated article, the temperature of the extrudate being maintained above the melting point thereof at the time of contact thereof with the surface to be coated, the temperature of the coating being lowered to below the melting point thereof while the said coating is being impressed against the surface to be coated.

In preferred embodiments the size of the die and the rate of forward motion of the article being coated are such as to produce a molten film which when in contact with the surface has a thickness of from 1 to 20 mils. However, thicknesses as large as 100 mils may also be used if desired. Any suitable mechanical device for producing such controlled motion of the article which is being coated may be used, e.g. driven pinch rolls suitably positioned.

When the surface to be coated is a metal, advantageous results are achieved by preheating the article to a temperature above the melting point of the thermoplastic coating, but below the decomposition temperature thereof. The coating solidifies while being impressed against the surface by the pressure of the injected gas. If desired, this solidification can be achieved by quenching the article as the coating is being applied thereto; for example, this can be done by applying a cooling fluid to the exterior surface of the article.

Flanges on pipes can also be coated by confining the plastic bubble in a manner such as to cause the plastic to press against the flange surface while coating the interior of the pipe. While in many of the most important applications the article to be coated is composed of steel, it is to be understood that the article may be composed of any other suitable material such as other metals (copper, aluminum, grass, etc.), a fibrous or non-fibrous cellulosic material (cardboard, vulcanized fiber, cellophane, etc.); a superpolyamide, polyimide, etc.; or a relatively high-melting or non-melting synthetic resin, such as isotactic polymers, especially polypropylene, acrylics, high density polyethylene (density 0.95 and higher), per oxide-cured or radiation-cured polyethylene and other suitably cured polyolefins.

The invention is illustrated further by means of the accompanying drawing. Figure I is a cross-section view of a suitable arrangement of equipment immediately after the start of the process herein disclosed. In a specific embodiment, a steel pipe 11 is slidably positioned over the elongated tube 5 confining the thermoplastic material in the passage 8. Preferably the pipe 11 is concentric with the elongated tube 5. The thermoplastic material is moved through the passage 8 by the action of the extruder 1, thence through the annular die 7. A pressure gauge 2 measures the extrusion pressure, and a thermocouple 3 measures the temperature. Spacers 6, placed at suitable intervals along the tube 5, separate said tube from the pipe 11. Extrudate 13 is released through the annular die 7 in the form of a hollow tube, which is sealed by pinching. Air is introduced via an air line 4 positioned lengthwise along the elongated tube 5, the air line being directed to a bore in the spider 12, which is adapted to control the die size. This bore communicates with the bubble 10. Figure II shows the relative positions of the extrudate 13 and the pipe 11 in the next stage of the process. The pipe 11 is positioned over the annular die 7, as a result of having been moved in the direction of the extrudate flow. The extrudate 13 is forced against the inner wall of the pipe 11 by the injected air. The thickness of the lining is controlled by the size of the annular die opening and the rate of take-off of the lined pipe, the motion of which tends to draw the extrudate away from the extruder. Means not shown, for moving the pipe 11 in the direction of the flow are provided. Figure III shows the relative positions of the extrudate 13 and the lined pipe 11 ahead of the die when the coating is completed just before severing the extrudate between the die and the coated article. In the preferred method of practicing the invention, the extrudate 13 is pinched off on the forward side of the die, to allow formation of an extrudate bubble in preparation for a repetition of the process in a succeeding cycle. This is done when the pipe has moved ahead of the die as shown in Figure III. The coated pipe is received on the supports 9, suitable cables and clamps being used to facilitate the controlled motion of the pipe 11.

The method of the invention is also illustrated by means of the following examples.

*Example I*

A cardboard cylindrical tube having an inside diameter of 3 inches was placed over an extruded die equipped with an air injection line as shown in Figure I. Polyethylene was extruded through the annular die. The extruded tube was pinched off to form a bubble, which was expanded by injection of air to effect contact with the inner surface of the cardboard cylinder. This cylinder was moved forward at the rate of 9.5 feet per minute. The molten film solidified after contact with the cardboard surface to form a lining in the cardboard cylinder.

*Example II*

A polymethyl methacrylate pipe having an inside diameter of about 2 inches was lined with nylon (polyhexamethylene adipamide) using the method of Example I. In this experiment the temperature of the stock was 450° F., the extrusion pressure was 4000 p.s.i.g., the take-off rate was 14 feet per minute, and the output of extrudate was 0.8 pound per minute. Nitrogen was used as the inflating gas in place of air, the nitrogen pressure being 4 p.s.i.g. Good linings were obtained.

*Example III*

A 3 inch (I.D.) steel pipe, preheated to 500° F., was slid over an elongated die as shown in Figure I, and a polyethylene (melting point about 230° F.) bubble was produced as shown in the figure, using a stock temperature of 315° F. Extrusion pressure was 3000 p.s.i.g., and take-off rate was 15.5 feet per minute, the pipe being moved forward at that rate. The output of polyethylene was 0.45 pound per minute. Air pressure was 5 p.s.i.g. A pyrometer test of the surface of the steel pipe showed that the temperature was 450° to 500° F. as the lining was being applied. Tap water was used on the outside of the pipe to effect quenching, after the coating had been applied. When the application of the coating was complete, the polyethylene tubing was severed and pinched off. The coated pipe was cut to test the adhesion of the liner. The liner could not be peeled from the pipe.

*Example IV*

Example III was repeated using polyethylene containing 2.5% by weight of titania filler. The resultant lining was white, opaque and porcelain-like in appearance. It could not be peeled from the interior of the pipe.

It is to be understood that the foregoing examples are illustrative only and that numerous embodiments of the invention will occur to those who are skilled in the art. Carbon, colloidal silica, or other suitable fillers may be used if desired in place of titania. Especially valuable results are obtained using pigmented resins, particularly pigmented high molecular weight polyoxymethylene resins in the coatings. Polyolefin resins in the form of thin coatings need no additives to aid adhesion, but when thicker coatings are desired, additives such as fumaric acid, which are disclosed in the Busse and Boxler U.S. Patent 2,838,437, issued June 10, 1958, are quite effective. Primers, including those made from polyisocyanates, or other adhesive coatings for producing high bond strength between resin and metal surfaces may be used in particular embodiments. Suitable methods for cross-linking of linings after application, e.g. by means of high speed electrons, organic peroxides and the like, in the known manner, may be employed if desired.

We claim:

1. A method for applying a coating upon the interior surface of an article having a tubular shape, which comprises conducting thermoplastic material through an elongated walled passage to an annular die, the inner surface of the article to be coated being initially exterior to the outer surface of the wall confining said passage, extruding the thermoplastic material through the annular die, injecting a gas into the tube of thermoplastic material thus formed and sealing the resultant thermoplastic tube to form a bubble, moving the article to be coated in the direction of the flow of thermoplastic material, and over said bubble, into a position concentric with the annular die, continuing the motion of the said article in the direction of the flow of thermoplastic material and continuing the injection of gas, whereby the thermoplastic material is impressed against the said interior surface to be coated, continuing further the said motion of the said article while it is being coated, and the said impressing of the thermoplastic material against the surface which is being coated until the coating is completed and the article has moved forward of said die, and thereafter severing the thermoplastic extrudate between the die and the coated article, the temperature of the extrudate being maintained above the melting point thereof at the time of contact thereof with the surface to be coated, the temperature of the coating being lowered to below the melting point thereof while the said coating is being impressed against the surface to be coated.

2. Method of claim 1 wherein the article to be coated is composed of metal, and is preheated to a temperature above the melting point of the thermoplastic material but below the decomposition temperature thereof.

3. Method of claim 2 wherein the metal article which is being coated is quenched during the application of the thermoplastic coating, by means of a cooling fluid applied to the exterior surface thereof.

4. Method of claim 3 wherein the said metal is steel, and the said thermoplastic is polyethylene.

5. Method of claim 1 wherein the article having a tubular shape is composed of cellulose.

6. Method of claim 1 wherein the article having a tubular shape is a sheet metal duct.

7. Method of claim 1 wherein the article having a tubular shape is composed of a polyolefin resin, and the extruded thermoplastic material is another thermoplastic resin, having a lower melting point than that of the resin in the tubular article.

References Cited in the file of this patent

UNITED STATES PATENTS

| | | |
|---|---|---|
| 2,710,987 | Sherman | June 21, 1955 |
| 2,724,672 | Rubin | Nov. 22, 1955 |
| 2,781,551 | Richerod | Feb. 19, 1957 |
| 2,805,787 | Sherman | Sept. 10, 1957 |

FOREIGN PATENTS

| | | |
|---|---|---|
| 453,123 | Great Britain | Sept. 1, 1936 |
| 1,097,943 | France | Feb. 23, 1955 |